United States Patent Office 3,028,351
Patented Apr. 3, 1962

3,028,351
PRESSURE SENSITIVE ADHESIVE COMPOSITION COMPRISING POLYVINYLPYRROLIDONE AND POLYETHYLENE POLYAMINE, ARTICLE COATED THEREWITH AND METHOD OF MAKING SAME
Karl F. Plitt, Kensington, Md., assignor to the United States of America as represented by the Secretary of Commerce
No Drawing. Original application Sept. 20, 1957, Ser. No. 685,355, now Patent No. 2,985,609, dated May 23, 1961. Divided and this application Aug. 10, 1960, Ser. No. 48,789
3 Claims. (Cl. 260—29.6)

The present invention relates to pressure-sensitive adhesives and articles involving such adhesives and particularly contemplates a pressure-sensitive adhesive which is water soluble.

The present invention is a division of application Serial No. 685, 355, Water-Soluble Pressure-Sensitive Adhesive, filed September 20, 1957, in the name of Karl F. Plitt, which has now matured into Patent No. 2,985,609.

Existing pressure-sensitive adhesive products such as commercially available pressure-sensitive cellophane tape have an infinite variety of usages and applications. However, all of such known types of pressure-sensitive adhesives require an organic solvent in order to remove any residue which may remain on the article to which the pressure-sensitive adhesive has been applied or to remove the tape when aging or extreme temperature changes prevent clean removal. While generally, especially when freshly applied, the adhesive material is readily removable, after long periods of application, particularly to plastic surfaces, the adhesive material has a tendency to stick and remain on the surface of the material to which the adhesive product is applied. The use of organic solvents to remove the adhesive residue is not always feasible since the solvent will often mar the surface of the particular plastic or other material to which the adhesive product has been applied. Consequently, tedious scraping is often necessary with the consequent danger of the surface scratching.

The present invention offers an adhesive substance which is suitable for use in pressure-sensitive adhesive applications and which can readily be removed by the use of water as a solvent. Furthermore, the adhesive according to the present invention has a much higher adhesive or bonding strength than commercially available known types of pressure-sensitive adhesives.

It is accordingly a principal object of the present invention to produce a pressure-sensitive adhesive which is water soluble and which possesses a high degree of bonding or adhesive strength.

A further object of the present invention is to provide a pressure-sensitive material having an adhesive which is water soluble.

A still further object of the present invention is to provide a pressure-sensitive adhesive which may be employed in applications requiring the removal of the adhesive by solvents and in which the use of organic types of solvents would be injurious to the material to which the adhesive is applied.

The present invention contemplates a pressure-sensitive adhesive comprising polyethylene amine in combination with either polyvinyl alcohol or polyvinyl pyrollidone. The adhesive may be applied to a backing material such as plastic film, paper, fabric, or other sheet material in a thin layer, and has an adhesive property superior to known commercially available types of pressure-sensitive adhesive materials. The water soluble property of the adhesive permits removal by a simple water wash.

The material has a special utility as a pressure-sensitive tape where the complete removal of adhesive is important, especially where the use of organic solvents would result in damage to the material to which the pressure-sensitive product has been applied. The adhesive according to the present invention has particular utility for use in applying protective paper or other coverings for plastic sheet material. Protective coverings such as kraft paper are applied to plastic materials such as, for example, Plexiglas, to prevent injury to the surface of the plastic during shipment and during manufacture procedures. By the use of the adhesive of the present invention, the protective covering may readily be removed with water with no consequent damage to the plastic.

The specific examples of the manner in which the invention can be practiced follow.

Example 1.—Polyvinyl alcohol of relatively high viscosity is dissolved by dispersion in water. Preferably one part of polyvinyl alcohol to 10 parts of water are employed; it is to be understood that the particular ratio of water employed can be varied, depending on the viscosity of the adhesive desired. The dispersed mixture of polyvinyl alcohol and water is then heated by means of steam or other indirect heating means, the mixture being stirred or agitated until the polyvinyl alcohol is dissolved in the water. Polyethylene amine having the structural formula $$H_2N(C_2H_4NH)_nH$$

where $n$ has a value between 15 and 35 is added to the above solution and the solution is stirred or agitated until the polyethylene amine is uniformly dispersed. Preferably 12 parts of polyethylene amine are employed.

The resulting product is a heavy liquid solution, the viscosity of which can be varied depending on the amount of water employed. Such solution can be used as a pressure-sensitive adhesive by application to any desired material. For example, to form a tape or other sheet material adhesive, any conventional known type of surface coating means is employed to apply the solution to the sheet material. Specifically, the adhesive solution can be applied by spraying, brushing, roller coating, spreading, or any other method commonly employed to apply surface coatings. As a particular example of a pressure-sensitive material, the adhesive made in accordance with the above example can be applied to cellophane tape, paper or Mylar. The resulting product is a pressure-sensitive tape or sheet laminate which can readily be removed by peeling and has a further advantage in that the adhesive is soluble in water. The ability to remove the adhesive with a water wash is particularly advantageous when the tape or other adhesive material has been left in contact for a long period of time. Aging of pressure-sensitive tapes results in a clinging effect and the tapes are difficult to remove without a proper solvent.

After preparation as a coating in the above-illustrated example, the adhesive of the present invention can be dessicated or dried. The adhesive when dried remains in intimate contact with the sheet material to which it has been applied and the material may be coiled or otherwise compacted. When it is subsequently to be used as an adhesive it is merely wetted by the application of water in the form of vapor, for example, thereby restoring its pressure-sensitive qualities.

Example 2.—Polyethylene amine of the above-described structural formula may also be combined with polyvinyl pyrollidone to form a pressure-sensitive adhesive. The adhesive is prepared by dissolving one part of polyvinyl pyrollidone in 10 parts of warm water and agitating. Three parts of polyethylene amine is then added and agitation is continued until a uniform solution is produced. The resulting adhesive does not have as great a bonding strength as the adhesive described in connection with Example 1, but is also water soluble and is superior in adhesive qualities to commercially available pressure-sensitive tapes.

The adhesives made in accordance with the principles of the present invention have bonding strengths which exceed five pounds per inch of width and actually vary between five and ten pounds per inch of width. Such bonding characteristics is much higher than commercially available cellophane tapes which have bonding strengths which vary between one and four pounds per inch of width.

It will be apparent that the embodiments shown are only exemplary and that various modifications can be made within the scope of invention as defined in the appended claims.

What is claimed is:

1. A pressure-sensitive adhesive composition comprising a mixture of polyethylene amine having the structural formula $$H_2N(C_2H_4NH)_nH$$

in which $n$ has a value approximately between 15 and 35, polyvinyl pyrollidone and water, in which the ratio in parts of the substances in said composition is approximately 3:1:10, respectively.

2. A pressure-sensitive adhesive material comprising a backing material, a dry coating on at least one surface of said material, said coating prior to drying being a composition comprising a mixture of polyethylene amine having the structural formula $$H_2N(C_2H_4NH)_nH$$

in which $n$ has a value approximately between 15 and 35, polyvinyl pyrollidone and water, in which the ratio in parts of the substances in said composition is approximately 3:1:10, respectively.

3. The method of making a pressure-sensitive adhesive material comprising the steps of uniformly coating at least one surface of a backing material with an adhesive composition comprising a mixture of polyethylene amine having the structural formula $$H_2N(C_2H_4NH)_nH$$

in which $n$ has a value approximately between 15 and 35, polyvinyl pyrollidone and water, in which the ratio in parts of the substances in said composition is approximately 3:1:10, respectively, and drying said surface until substantially all of the water is removed.

References Cited in the file of this patent
UNITED STATES PATENTS
2,938,812    Marzocchi et al. _____ May 31, 1960